(12) United States Patent
Little

(10) Patent No.: US 10,498,521 B2
(45) Date of Patent: Dec. 3, 2019

(54) SWITCHED-FILTER DUPLEXING ARCHITECTURE FOR FRONT-END SYSTEMS

(71) Applicant: SKYWORKS SOLUTIONS, INC., Woburn, MA (US)

(72) Inventor: Christopher Robert Little, Gilroy, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 6 days.

(21) Appl. No.: 15/690,259

(22) Filed: Aug. 29, 2017

(65) Prior Publication Data

US 2018/0131501 A1 May 10, 2018

Related U.S. Application Data

(60) Provisional application No. 62/381,734, filed on Aug. 31, 2016.

(51) Int. Cl.

| *H04L 5/14* | (2006.01) |
| *H04B 1/00* | (2006.01) |
| *H04B 1/48* | (2006.01) |
| *H04W 88/06* | (2009.01) |
| *H04L 5/00* | (2006.01) |
| *H04L 27/00* | (2006.01) |

(52) U.S. Cl.
CPC ......... *H04L 5/1461* (2013.01); *H04B 1/0064* (2013.01); *H04B 1/48* (2013.01); *H04L 5/143* (2013.01); *H04L 5/001* (2013.01); *H04L 27/0002* (2013.01); *H04W 88/06* (2013.01)

(58) Field of Classification Search
CPC ......... H04L 5/1461; H04L 5/143; H04L 5/14; H04B 1/0064; H04B 1/48; H04B 88/06; H04B 1/00
USPC .................................. 370/278; 455/552, 464
See application file for complete search history.

(56) References Cited

U.S. PATENT DOCUMENTS

| 7,142,829 B2 * | 11/2006 | Sung | H04B 7/0608 |
| | | | 455/101 |
| 7,855,984 B2 * | 12/2010 | Chu | H04B 1/48 |
| | | | 370/281 |
| 7,948,924 B2 * | 5/2011 | Seo | H04B 1/48 |
| | | | 370/280 |
| 8,670,726 B2 * | 3/2014 | Poulin | H04B 1/0064 |
| | | | 455/553.1 |

(Continued)

*Primary Examiner* — Man U Phan
(74) *Attorney, Agent, or Firm* — Chang & Hale LLP

(57) ABSTRACT

Switched-filter duplexing architecture for front-end systems. In some embodiments, a wireless architecture can include a first system having a first signal routing circuit for a first transceiver, and a first antenna node, and be configured to be capable of simultaneous transmit and receive operations for a first band and a receive operation for a second band through the first antenna node. The wireless architecture can further include a second system having a second signal routing circuit for a second transceiver and a second antenna node, and be configured to be capable of a transmit operation for the second band through the second antenna node. The wireless architecture can further include a switchable path implemented to selectively allow the transmit operation for the second band to be performed through the second antenna node of the second system or the first antenna node of the first system.

15 Claims, 15 Drawing Sheets

(56) References Cited

U.S. PATENT DOCUMENTS

| | | | | |
|---|---|---|---|---|
| 9,048,913 B2* | 6/2015 | Kludt | .................... | H04B 7/0689 |
| 9,252,819 B2* | 2/2016 | Satake | ................. | H03K 17/693 |
| 9,484,961 B2* | 11/2016 | Lum | .................... | H04B 1/0064 |
| 9,755,681 B2* | 9/2017 | Wilhelm | ............... | H04B 7/0805 |
| 9,755,690 B2* | 9/2017 | Kanou | ................. | H04B 1/006 |
| 9,954,269 B2* | 4/2018 | Qi | .......................... | H04B 1/005 |
| 10,056,936 B2* | 8/2018 | Onaka | ..................... | H01P 1/213 |
| 2007/0223615 A1* | 9/2007 | Dosanjh | ............... | H04B 1/0057 |
| | | | | 375/267 |
| 2014/0185498 A1* | 7/2014 | Schwent | .............. | H04B 1/0057 |
| | | | | 370/297 |
| 2014/0194074 A1* | 7/2014 | Klomsdorf | ........... | H04B 1/0458 |
| | | | | 455/77 |
| 2016/0126990 A1* | 5/2016 | Leipold | ................ | H04W 72/04 |
| | | | | 370/329 |
| 2018/0102805 A1* | 4/2018 | Ukon | ....................... | H04B 1/52 |

* cited by examiner

SWITCHED-FILTER DUPLEXING ARCHITECTURE FOR FRONT-END SYSTEMS

CROSS-REFERENCE TO RELATED APPLICATION(S)

This application claims priority to U.S. Provisional Application No. 62/381,734 filed Aug. 31, 2016, entitled SWITCHED-FILTER DUPLEXING ARCHITECTURE FOR FRONT-END SYSTEMS, the disclosure of which is hereby expressly incorporated by reference herein in its entirety.

BACKGROUND

Field

The present disclosure relates to duplexing architectures and methods for wireless applications.

Description of the Related Art

In wireless applications, a duplexing technique can be utilized to allow simultaneous transmit and receive operations. For example, a frequency-division duplexing (FDD) technique utilizes transmit and receive bands that are non-overlapping and sufficiently separated in frequency. Such transmit and receive bands are commonly facilitated by a duplexer that includes a transmit filter and a receive filter.

SUMMARY

According a number of implementations, the present disclosure relates to a wireless architecture that includes a first system including a first signal routing circuit for a first transceiver, and a first antenna node. The first system is configured to be capable of simultaneous transmit and receive operations for a first band and a receive operation for a second band through the first antenna node. The wireless architecture further includes a second system including a second signal routing circuit for a second transceiver and a second antenna node. The second system is configured to be capable of a transmit operation for the second band through the second antenna node. The wireless architecture further includes a switchable path implemented to selectively allow the transmit operation for the second band to be performed through the second antenna node of the second system or the first antenna node of the first system.

In some embodiments, the first system can include an antenna switch circuit and a frequency-division duplexing path for the first band operations. The frequency-division duplexing path can include a first duplexer coupled to the first transceiver through transmit and receive paths, and be coupled to the antenna switch circuit through a common path. The first system can further include a common path between the antenna switch circuit and the first antenna node. The first system can further include a receive path for the second band receive operation, and the receive path can include a receive filter associated with the first transceiver and coupled to the antenna switch. The receive filter of the receive path can be coupled to the antenna switch circuit through the same common path that couples the first duplexer and the antenna switch circuit. The antenna switch circuit can be configured such that the frequency-division duplexing operations of the first band and the second band receive operation can be achieved through a single switch.

In some embodiments, the second system can further include a transmit path for the second band transmit operation. The transmit path can include an arrangement of a transmit filter, a first switch, and a second switch between the second transceiver and the second antenna node. Each of the first switch and the second switch can include a pole and first and second throws, with the pole of the first switch being coupled to the transmit filter and the pole of the second switch coupled to the second antenna node, with the first throw of first switch and the first throw of the second switch being coupled to provide a transmit route between the transmit filter and the second antenna node. The second throw of the first switch can be coupled to the switchable path to provide a transmit route between the transmit filter of the second system and the first antenna node. The first switch can be configured to provide a desired amount of isolation between the first system and the second system, such that an intermodulation distortion resulting from one system to the other system is below a selected level.

In some embodiments, the receive filter of the first system and the transmit filter of the second system can provide duplexing functionality by the first switch of the second system and the antenna switch circuit of the first system. The transmit filter of the second system can be coupled through the first antenna node of the first system through another single switch of the antenna switch circuit.

In some embodiments, the first system and the second system can be configured to be capable of supporting an uplink carrier aggregation operation with the first transmit band and the second transmit band.

In some embodiments, the wireless architecture can further include a transmit select switch implemented to allow routing of a transmit signal from the first transceiver to the second signal routing circuit, and/or routing of a transmit signal from the second transceiver to the first signal routing circuit. In some embodiments, the transmit select switch can include a double-pole-double-throw functionality, with a first pole coupled to the first transceiver, a second pole coupled to the second transceiver, a first throw coupled to a power amplifier of the first system, and a second throw coupled to a power amplifier of the second system. In some embodiments, the first band can include a cellular band B3, and the second band can include a cellular band B1.

In some implementations, the present disclosure relates to a front-end module that includes a packaging substrate configured to receive a plurality of components, and a front-end architecture implemented on the packaging substrate. The front-end architecture includes a first system having a first signal routing circuit for a first transceiver and a first antenna node. The first system is configured to be capable of simultaneous transmit and receive operations for a first band and a receive operation for a second band through the first antenna node. The front-end architecture further includes a second system having a second signal routing circuit for a second transceiver and a second antenna node. The second system is configured to be capable of a transmit operation for the second band through the second antenna node. The front-end architecture further includes a switchable path implemented to selectively allow the transmit operation for the second band to be performed through the second antenna node of the second system or the first antenna node of the first system.

In some teachings, the present disclosure relates to a wireless device that includes a first transceiver and a second transceiver. The wireless device further includes a first antenna and a second antenna. The wireless device further includes a front-end architecture implemented between the first and second transceivers and the first and second antennas. The front-end architecture includes a first system having a first signal routing circuit for the first transceiver and the first antenna, with the first system being configured to be capable of simultaneous transmit and receive operations for a first band and a receive operation for a second band through the first antenna. The front-end architecture further includes a second system having a second signal routing circuit for the second transceiver and the second antenna, with the second system being configured to be capable of a transmit operation for the second band through the second antenna. The front-end architecture further includes a switchable path implemented to selectively allow the transmit operation for the second band to be performed through the second antenna or the first antenna.

In some embodiments, the wireless device can be a cellular phone. The first band can include, for example, a cellular band B3, and the second band can include, for example, a cellular band B1.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

A radio system which transmits two signals simultaneously can involve various design considerations. For example, in some uplink (UL) carrier-aggregation (CA) applications such as those utilized in 3GPP (3rd Generation Partnership Project) system, intermodulation distortion (IMD) products resulting from two high power transmit signals incident on any non-linear behaving device in receive (Rx) or transmit (Tx) signal chain can impact one or more of frequency-division duplexing (FDD) receiver bands, thereby resulting in Rx de-sensitization. For example, transmit signals in cellular bands B1 Tx and B3 Tx can result in Rx de-sensitization of a receive band B1 Rx.

In the foregoing radio system, the second transmit signal typically requires an additional transmitter path and related hardware in order to generate, amplify and filter the second transmit (uplink) signal. Such a design typically requires an additional circuit board area and component cost.

In some embodiments, the second transmit signal may be transmitted via a second antenna or the main antenna (e.g., in a FDD Tx+Rx mode) facilitating two different architectures.

Figure 1:
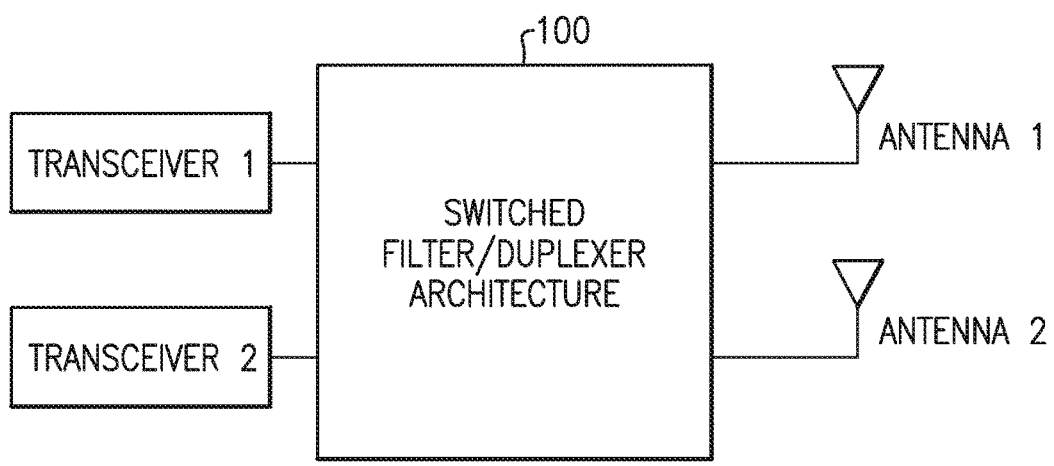
FIG. 1 depicts a switched filter/duplexer architecture having one or more features as described herein.

FIG. 1 depicts a switched filter/duplexer architecture 100 having one or more features as described herein. Such an architecture can address some or all of the foregoing issues associated with simultaneous transmission of two uplink signals.

It will be understood that while some of the examples are described herein in the context of the 3GPP system, one or more features of the present disclosure can also be implemented with other wireless systems. It will also be understood that while some examples are described herein in contexts of specific cellular bands, one or more features of the present disclosure can also be implemented with other frequency bands, as well as in more generic settings involving generic frequency bands that are compatible for operations such as carrier-aggregation (uplink and/or downlink) operation and/or FDD operation.

Figure 2:
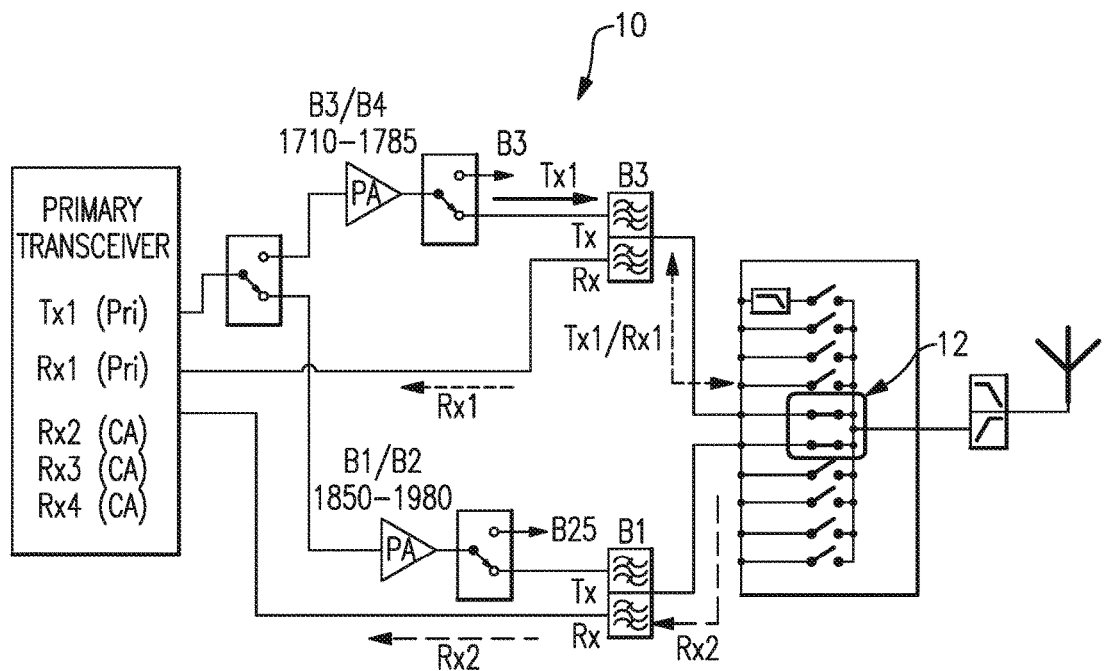
FIG. 2 shows an example of a downlink (DL) carrier aggregation (CA) architecture utilizing frequency-division duplexing (FDD) functionality.
Figure 3:
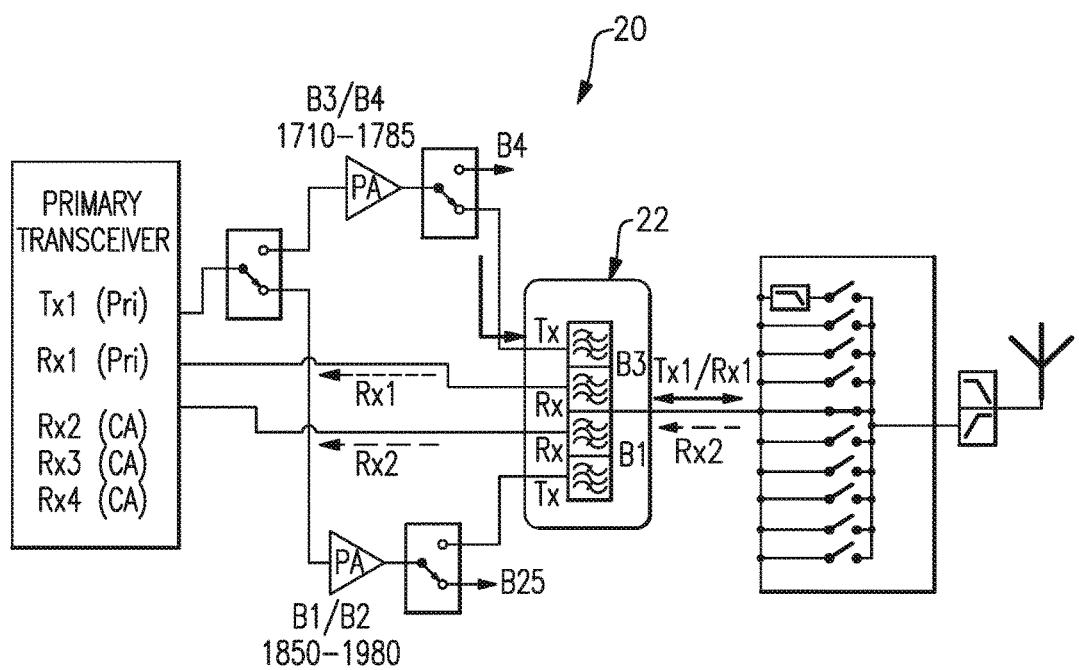
FIG. 3 shows another example of a downlink (DL) carrier aggregation (CA) architecture utilizing frequency-division duplexing (FDD) functionality.

FIGS. 2 and 3 show examples of downlink (DL) carrier aggregation (CA) architectures utilizing FDD functionality. In FIGS. 2 and 3, two example bands are mid-bands (MBs) (e.g., B3 Rx+B1 Rx); however, it will be understood that other bands (including non-MB bands) can also be utilized.

In the example of FIG. 2, a primary transceiver associated with a front-end architecture 10 is shown to be capable of processing Tx and Rx signals associated with a primary band (e.g., B3), as well as one or more Rx signals associated with respective Rx bands (e.g., B1, B2, B25). For the purpose of description, suppose that the primary Tx signal (Tx1) is a B3 Tx signal, and the primary Rx signal (Rx1) is a B3 Rx signal. Thus, FDD operation involving such Tx and Rx signals can be facilitated by a B3 duplexer as shown, where Tx1 signal is sent through the B3 duplexer for transmission, and Rx1 signal is output from the B3 duplexer for further processing by the primary transmitter.

From the B3 duplexer, the duplexed signal (double-ended arrow indicated as Tx1/Rx1) is shown to be routed to/from a primary antenna through an antenna switch (e.g., an antenna switch module (ASM)). From the same antenna, a second Rx signal (Rx2) is shown to be routed to a B1 duplexer through the antenna switch. From the B1 duplexer, the filtered signal (Rx2) is shown to be routed to the primary transceiver for further processing.

Accordingly, Tx1 (e.g., B3 Tx) and Rx1 (e.g., B3 Rx) are shown to be processed simultaneously by FDD functionality, and Rx1 (e.g., B3 Rx) and Rx2 (e.g., B1 Rx) are shown to be processed simultaneously by CA functionality. In FIG. 2, a portion indicated as 12 in the antenna switch can facilitate such CA operation between Rx1 and Rx2. Assuming the foregoing B3 duplexer and the B1 duplexer, such a portion of the antenna switch (in which two switched paths are enabled simultaneously) can facilitate formation of a quadplexer by diplexing two duplexers (e.g., B3 and B1 duplexers).

In the example of FIG. 3, a primary transceiver associated with a front-end architecture 20 is shown to be similar to the example of FIG. 2. Similar to the example FIG. 2, suppose that the primary Tx signal (Tx1) is a B3 Tx signal, and the primary Rx signal (Rx1) is a B3 Rx signal. Thus, FDD operation involving such Tx and Rx signals can be facilitated by a B3 duplexer as shown, where Tx1 signal is sent through the B3 duplexer for transmission, and Rx1 signal is output from the B3 duplexer for further processing by the primary transmitter.

From the B3 duplexer, the duplexed signal (double-ended arrow indicated as Tx1/Rx1) is shown to be routed to/from a primary antenna through an antenna switch (e.g., an antenna switch module (ASM)). From the same antenna, a second Rx signal (Rx2) is shown to be routed to a B1 duplexer through the same switched signal path (as for the Tx1/Rx1 signal) of the antenna switch. From the B1 duplexer, the filtered signal (Rx2) is shown to be routed to the primary transceiver for further processing.

Accordingly, Tx1 (e.g., B3 Tx) and Rx1 (e.g., B3 Rx) are shown to be processed simultaneously by FDD functionality, and Rx1 (e.g., B3 Rx) and Rx2 (e.g., B1 Rx) are shown to be processed simultaneously by CA functionality. In FIG. 2, a quadplexer 22 is shown to be formed by diplexing two duplexers (e.g., B3 and B1 duplexers). Accordingly DL CA operation can be achieved through a single signal path.

Figure 4:
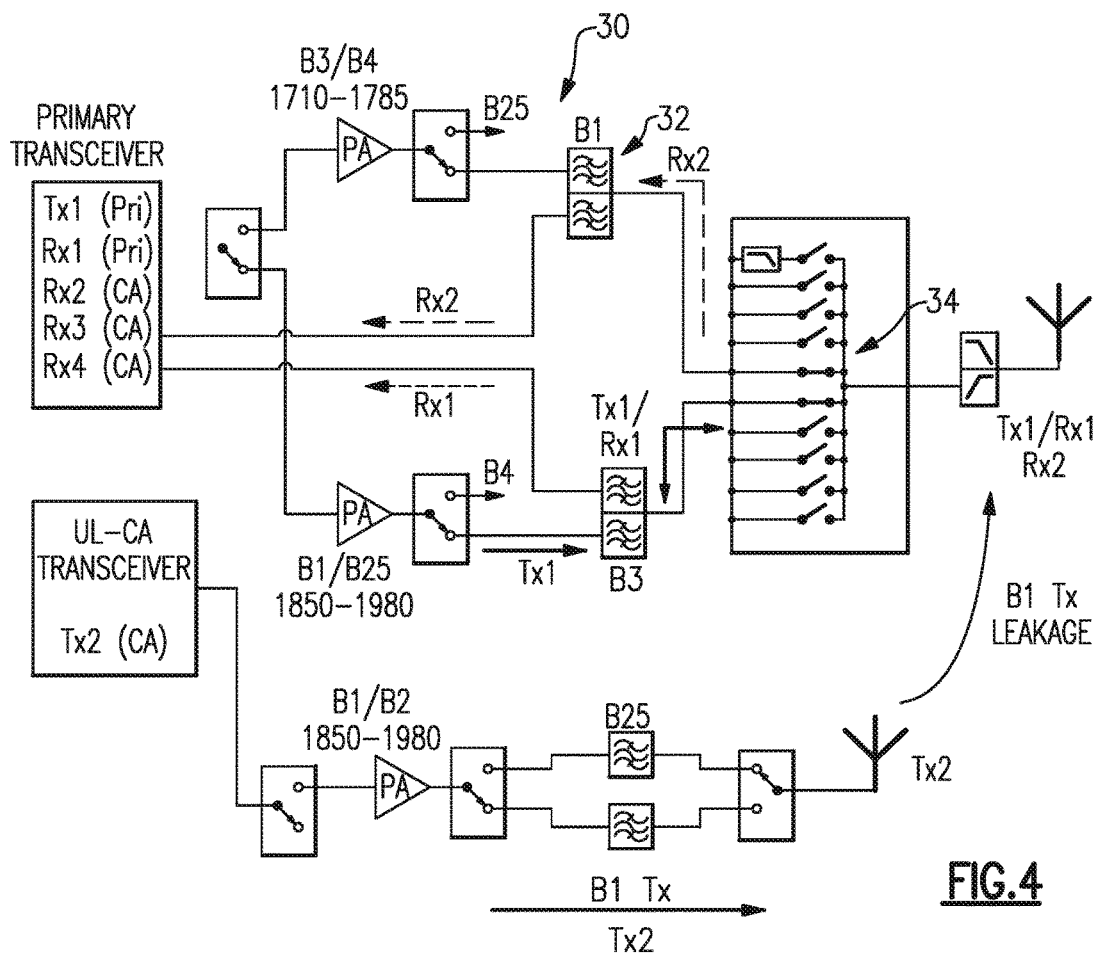
FIG. 4 shows an example front-end architecture configured to allow simultaneous processing of two receive (Rx) signals and simultaneous processing of two transmit (Tx) signals.

FIG. 4 shows an example front-end architecture 30 configured to allow simultaneous processing of two Rx signals and simultaneous processing of two Tx signals. In the example of FIG. 4, such simultaneous processing of two Tx signals is shown to be facilitated by implementation of a second transceiver (e.g., a UL-CA transceiver) and an additional Tx path.

In the example of FIG. 4, a primary transceiver is shown to be capable of processing Tx and Rx signals associated with a primary band (e.g., B3), as well as one or more Rx signals associated with respective Rx bands (e.g., B1, B2, B25). For the purpose of description, suppose that the primary Tx signal (Tx1) is a B3 Tx signal, and the primary Rx signal (Rx1) is a B3 Rx signal. Thus, FDD operation involving such Tx and Rx signals can be facilitated by a B3 duplexer as shown, where Tx1 signal is sent through the B3 duplexer for transmission, and Rx1 signal is output from the B3 duplexer for further processing by the primary transmitter.

From the B3 duplexer, the duplexed signal (double-ended arrow indicated as Tx1/Rx1) is shown to be routed to/from a primary antenna through an antenna switch (e.g., an antenna switch module (ASM)). From the same antenna, a second Rx signal (Rx2) (e.g., B1 Rx) is shown to be routed to a B1 duplexer through the antenna switch. From the B1 duplexer, the filtered signal (Rx2) is shown to be routed to the primary transceiver for further processing.

Accordingly, Tx1 (e.g., B3 Tx) and Rx1 (e.g., B3 Rx) are shown to be processed simultaneously by FDD functionality, and Rx1 (e.g., B3 Rx) and Rx2 (e.g., B1 Rx) are shown to be processed simultaneously by CA functionality. In FIG. 4, such CA functionality for Rx1 and Rx2 can be facilitated by the antenna switch, similar to the example of FIG. 2.

In the example of FIG. 4, a second Tx signal (Tx2) (e.g., B1 Tx) is shown to be generated by the second transceiver (UL-CA transceiver), amplified by a corresponding power-amplifier (e.g., B1/B2 PA), and routed to a second antenna through a B1 Tx filter. Accordingly, simultaneous transmit operations can be performed in the front-end architecture 30 of FIG. 4 for Tx1 (e.g., B3 Tx) and Tx2 (e.g., B1 Tx) bands.

As depicted in FIG. 4, the transmitted Tx2 signal (e.g., B1 Tx) can leak into the primary Tx/Rx system. Thus, various components associated with such a primary Tx/Rx system can be subjected to unfiltered power of both Tx1 and Tx2 signals. In FIG. 4, the B1 duplexer (32) and the antenna switch (34) are examples of such components that can suffer from such Tx1 and Tx2 signals.

In the example configuration of FIG. 4, de-sensing of a receive operation can result from the foregoing leakage of the Tx2 signal. For example, Rx2 (e.g., B1 Rx) operation can be de-sensed due to intermodulation of Tx1 and Tx2 signals. In a more specific example, a third-order intermodulation distortion (IMD3) needs to be less than approximately −110 dBm to avoid de-sensing of B1 Rx operation.

Figure 5:
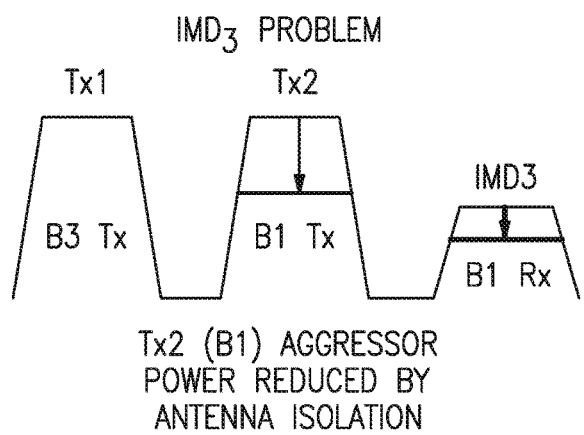
FIG. 5 shows an example where a transmit signal power is reduced by antenna switch isolation, and a receive signal power is reduced by intermodulation distortion.

Referring to FIG. 5, it is noted that the B1 Tx power can be reduced by antenna switch isolation, and the B1 Rx power can be reduced by an IMD3. Such an IMD3 can be calculated by a formula $IMD3=P2_{Tx2}+2(P1_{Tx1}-IP3)$. By way of an example, consider a design where $P1_{Tx1}=20$ dBm (e.g., nominal 3GPP specification for UL-CA transmit power at the corresponding antenna), and $P2_{Tx2}=5$ dBm (e.g., at the Tx1 antenna switch after isolation from the Tx2 antenna). With such values, IMD3 is approximately −95 dBm which is greater than the foregoing Rx de-sense threshold of −110 dBm. Thus, the example configuration of FIG. 4 can result in de-sensing of, for example, the B1 Rx operation.

Figure 6:
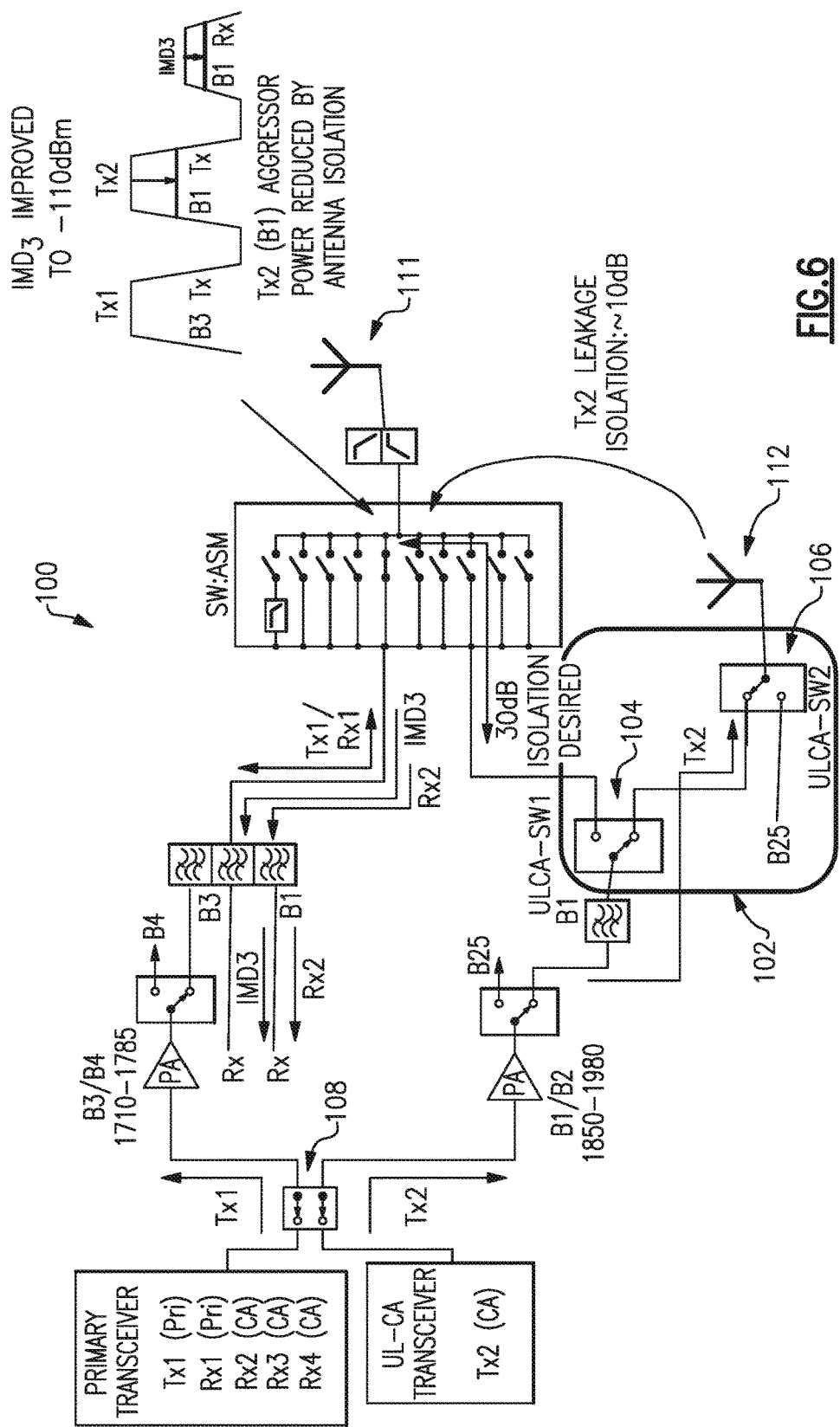
FIG. 6 shows an example front-end architecture configured to allow simultaneous processing of two receive signals and simultaneous processing of two transmit signals.

FIG. 6 shows an example front-end architecture 100 configured to allow simultaneous processing of two Rx signals and simultaneous processing of two Tx signals. In the example of FIG. 6, such simultaneous processing of two Tx signals is shown to be facilitated by implementation of a second transceiver (e.g., UL-CA transceiver) and an additional Tx path.

In the example of FIG. 6, a primary transceiver is shown to be capable of processing Tx and Rx signals associated with a primary band (e.g., B3), as well as one or more Rx signals associated with respective Rx bands (e.g., B1, B2, B25). For the purpose of description, suppose that the primary Tx signal (Tx1) is a B3 Tx signal, and the primary Rx signal (Rx1) is a B3 Rx signal. Thus, FDD operation involving such Tx and Rx signals can be facilitated by a B3 duplexer as shown, where Tx1 signal is sent through the B3 duplexer for transmission, and Rx1 signal is output from the B3 duplexer for further processing by the primary transmitter.

From the B3 duplexer, the duplexed signal (double-ended arrow indicated as Tx1/Rx1) is shown to be routed to/from a primary antenna through an antenna switch (e.g., an antenna switch module (ASM)). From the same antenna, a second Rx signal (Rx2) (e.g., B1 Rx) is shown to be routed to a B1 filter through the antenna switch. From the B1 filter, the filtered signal (Rx2) is shown to be routed to the primary transceiver for further processing.

Accordingly, Tx1 (e.g., B3 Tx) and Rx1 (e.g., B3 Rx) are shown to be processed simultaneously by FDD functionality, and Rx1 (e.g., B3 Rx) and Rx2 (e.g., B1 Rx) are shown to be processed simultaneously by CA functionality. In FIG. 6, such CA functionality for Rx1 and Rx2 can be facilitated by the antenna switch as shown.

In the example of FIG. 6, a second Tx signal (Tx2) (e.g., B1 Tx) is shown to be generated by the second transceiver (UL-CA transceiver), amplified by a corresponding power-amplifier (e.g., B1/B2 PA), and routed to a second antenna 112 through a B1 Tx filter, a switch 104, and a switch 106. The switches 104 and 106 are collectively indicated as 102 in FIG. 6. In the example of FIG. 6, the foregoing Tx1 and Tx2 signals from their respective transceivers are shown to be routed to their respective antennas through a switch 108. Accordingly, simultaneous transmit operations can be performed in the front-end architecture 100 of FIG. 6 for Tx1 (e.g., B3 Tx) and Tx2 (e.g., B1 Tx) bands.

In the example of FIG. 6, the switch 106, in conjunction with the post-PA switch (coupled to the output of the B1/B2 PA), can allow routing of the Tx2 signal from the B1/B2 PA to the second antenna 112 through the B1 filter, similar to the example of FIG. 4. In FIG. 6, however, the switch 104 is an additional switch that is not present in the example of FIG. 4. In some embodiments, the switch 104 can be configured to allow routing of the Tx2 signal to the second antenna 112 as shown in FIG. 6, or to route the Tx2 signal to the primary antenna 111.

Referring to the example of FIG. 6, it is noted that there can still be Tx2 leakage (e.g., approximately 10 dB) from the second antenna 112 into the primary Tx/Rx path. However, if an isolation of approximately 30 dB is provided between the switch 104 of the second Tx path and the switch circuit of the primary Tx/Rx path, the front-end configuration of FIG. 6 can provide an IMD3 value that is less than the example of FIGS. 4 and 5 (e.g., −95 dBm). In some embodiments, the front-end configuration of FIG. 6 can meet the example −110 dBm IMD3 threshold value described herein.

Figure 7:
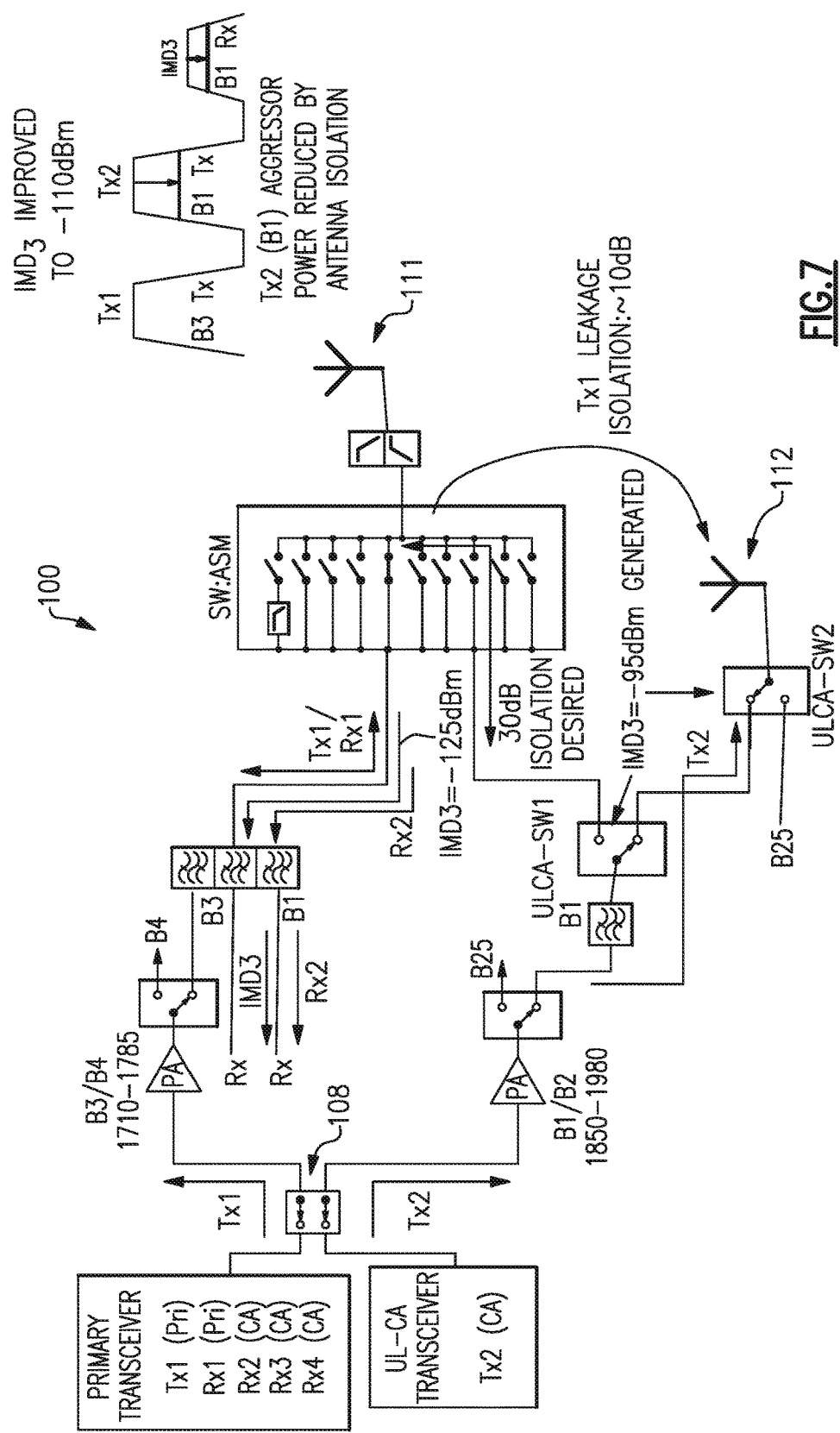
FIG. 7 shows the front-end architecture of FIG. 6, with IMD3 estimates shown for the primary Tx/Rx path, as well as for the second Tx path.

FIG. 7 shows the same front-end architecture 100 of FIG. 6. However, in FIG. 7, IMD3 estimates are shown on the primary Tx/Rx path, as well as on the second Tx path. As described in reference to FIG. 6, suppose that a leakage isolation of about 10 dB is provided between the primary antenna 111 and the second antenna 112, and that there is an approximately 30 dB isolation between the switch circuit of the primary Tx/Rx path and the switch 104 of the second Tx path. Then, it is estimated that an IMD3 value of about −125 dBm is present at the B1 Rx filter of the primary Tx/Rx path, and an IMD3 value of about −95 dBm at a node between the switches 104 and 106 of the second Tx path.

It is noted that the −125 dBm value at the primary Tx/Rx path is significantly better than the −95 dBm value in the example of FIG. 4. It is also noted that while the −95 dBm value at the second Tx path is greater than the example −110 dBm threshold for Rx de-sensing effect, such an IMD3 value may not be harmful for the front-end architecture 100 as shown, since the second Tx path does not include Rx functionality.

Figure 8:
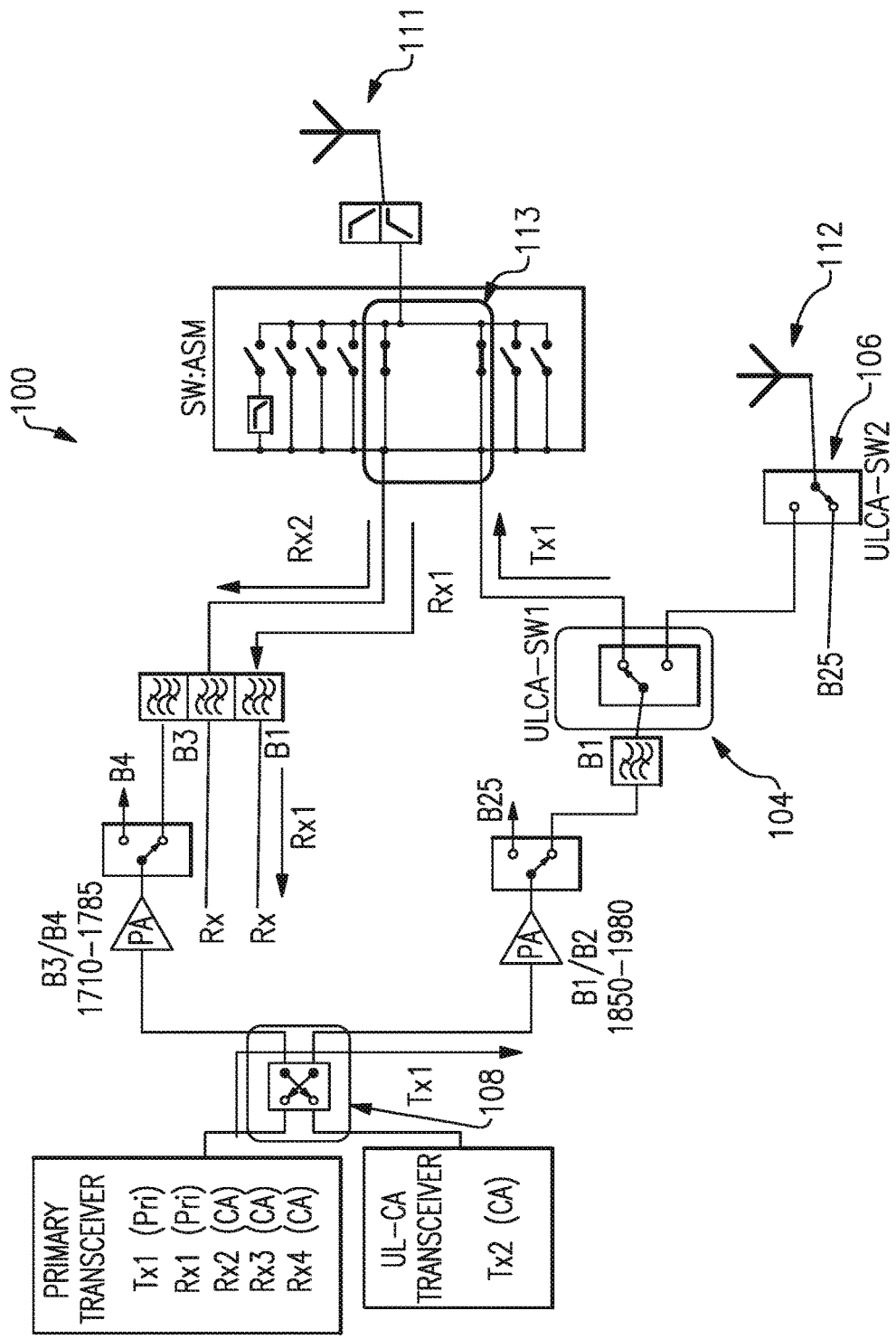
FIG. 8 shows the front-architecture of FIGS. 6 and 7 being operated in a non-UL-CA mode.

In some embodiments, the front-end architecture 100 of FIGS. 6 and 7 can provide advantageous features when operated in non-UL-CA modes. For example, FIG. 8 shows the same front-architecture 100 of FIGS. 6 and 7 being operated in a non-UL-CA mode. In the example of FIG. 8, the switch 108 can be configured (e.g., as a double-pole-double-throw (DPDT) switch having cross-coupling capability) to allow routing of a Tx signal from the primary transceiver to the second Tx path, and/or to route a Tx signal from the second transceiver (UL-CA transceiver) to the primary Tx/Rx path.

For example, the switch 108 can be put into a state where the primary transceiver is coupled to the second Tx path. In such a mode, the main transceiver can be configured to generate and drive an example B1 Tx signal (or B25 Tx signal) as a first Tx signal (Tx1) to be routed through the second Tx path. Having the primary transceiver (already powered) perform such driving function can allow the second transceiver to be powered down, to thereby reduce power consumption.

Configured in the foregoing manner, the Tx1 signal from the primary transceiver can be routed through the B1/B2 PA and the B1 filter. At the switch 104, the Tx1 signal can be routed to either the second antenna 112 or the primary antenna 111. It is noted that the ability to route the Tx1 signal to the primary antenna 111 is facilitated by the switchable path between the second Tx path and the primary Tx/Rx path.

It is also noted that the switch 104 adds some additional loss (e.g., about 0.25 dB) that is not present in the example of FIG. 4. However, benefits associated with such a switch and the cross-coupling capability it provides can offset such a loss. For example, if the Tx1 signal is routed to the primary antenna 111 by the switch 104 as shown in FIG. 8, the primary antenna 111 may provide better performance than the second antenna 112.

In the example of FIG. 8, simultaneous FDD operation of Tx1 (B1 Tx) and Rx1 (B1 Rx) can be achieved with the Rx1 signal being routed as shown. More particularly, the Rx1 signal can be received through the primary antenna 111, and be routed to the primary transceiver through the antenna switch and the B1 filter.

In the example of FIG. 8, simultaneous DL CA operation of Rx1 and Rx2 (e.g., B3 Rx) can be achieved with the Rx1 signal being routed as in the foregoing manner. The Rx2 signal can be received through the primary antenna 111, and be routed to the primary transceiver through the antenna switch and the B3 duplexer.

In the example of FIG. 8, it is noted that a portion 113 of the switch circuit (in which two arms are connected) forms a switched B1 duplexer from the B1 Tx filter of the second Tx path and the B1 Rx filter of the primary Tx/Rx path. Performance of such a switched duplexer is shown to be at dedicated duplexer levels; and examples of such performance are described in reference to FIGS. 9-16.

Figure 9:
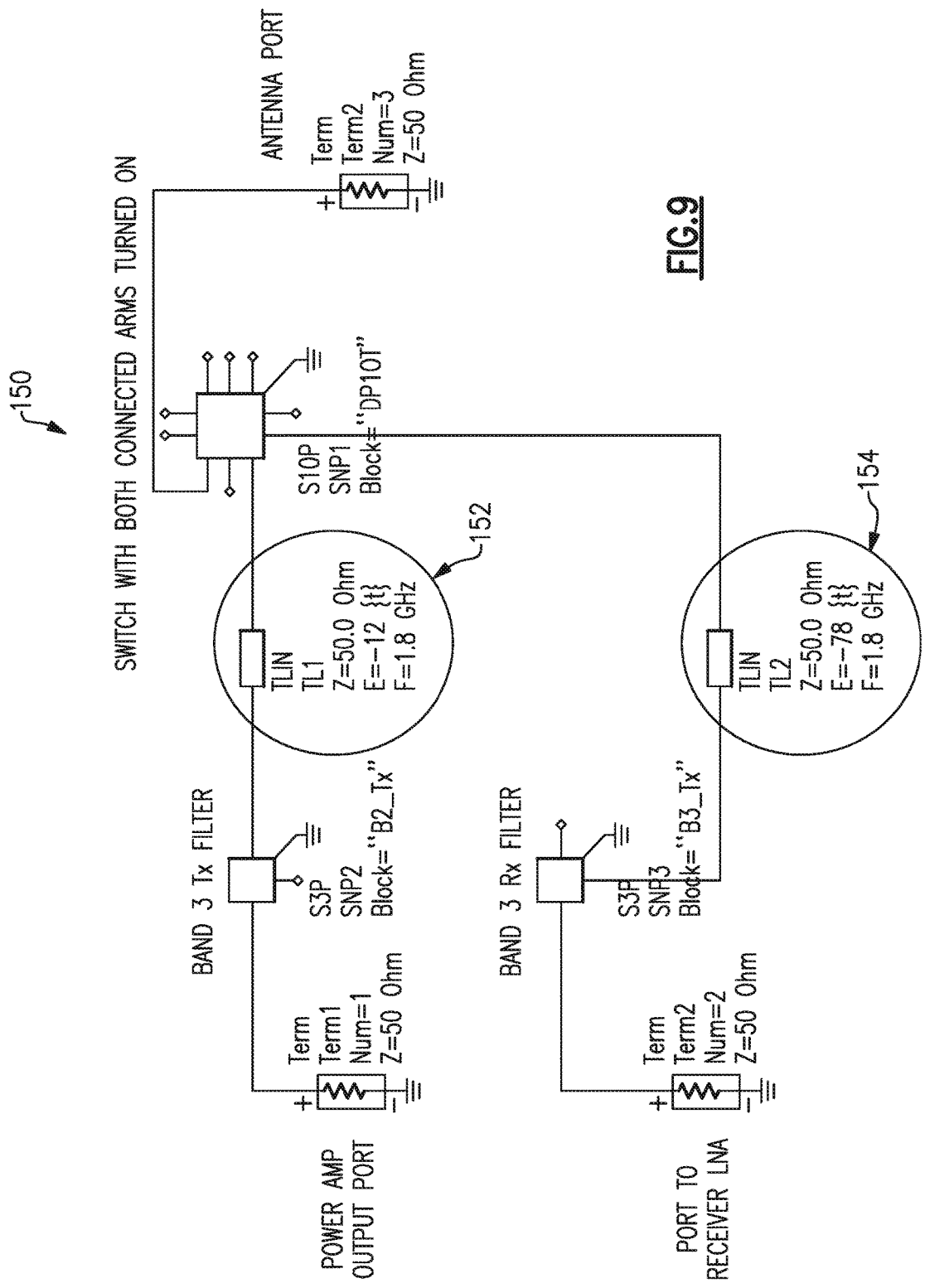
FIG. 9 shows an example simulation schematic for switch-combining of Tx and Rx filters to form duplexing functionality.

FIG. 9 shows an example simulation schematic 150 for switch-combining of Tx and Rx filters to form duplexing functionality. In the example shown, B3 Tx and B3 Rx filters are utilized, and phase shifts 152, 154 are implemented to enable diplexing of the two filters.

Figure 11:
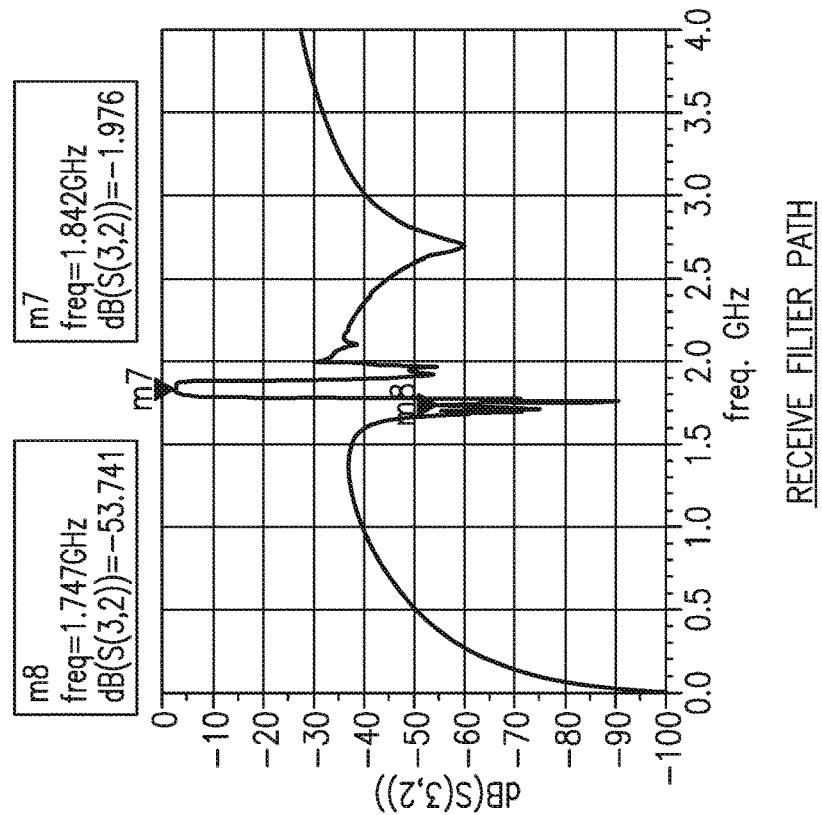
FIG. 11 shows an insertion loss plot for the Rx filter path associated with the switch-combined Tx and Rx filters of the configuration of FIG. 9.
Figure 10:
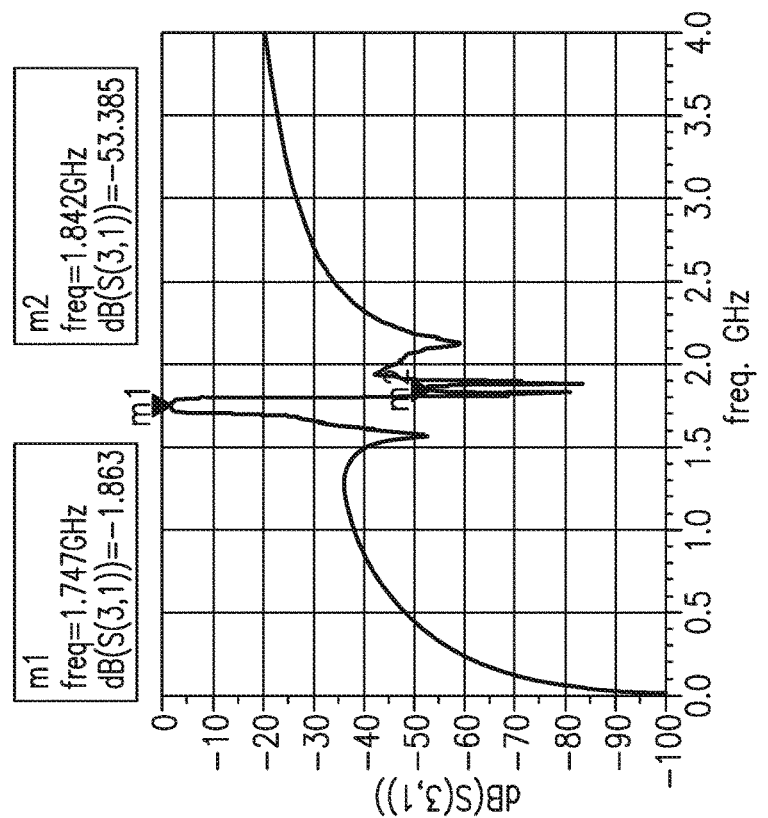
FIG. 10 shows an insertion loss plot for the Tx filter path associated with the switch-combined Tx and Rx filters of the configuration of FIG. 9.
Figure 12:
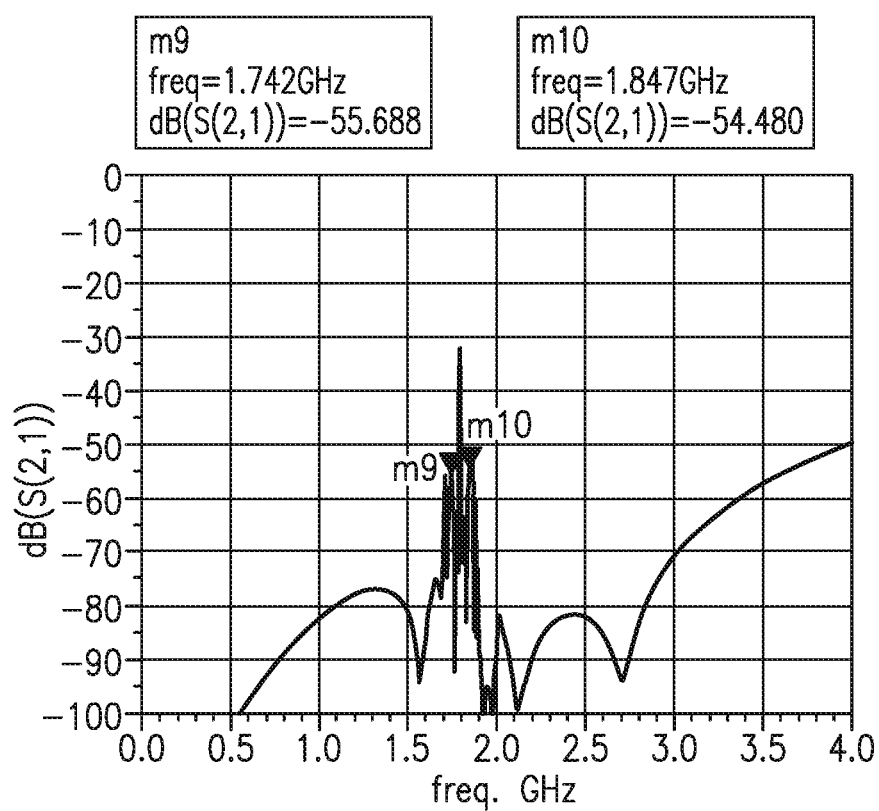
FIG. 12 shows a plot of isolation of the switch-combined Tx and Rx filters of the configuration of FIG. 9.

FIGS. 10 and 11 show plots of insertion losses associated with the switch-combined Tx and Rx filters of the configuration of FIG. 9. FIG. 10 is for the Tx filter path, and FIG. 11 is for the Rx filter path. FIG. 12 shows a plot of isolation of the switch-combined Tx and Rx filters of the configuration of FIG. 9.

Figure 13:
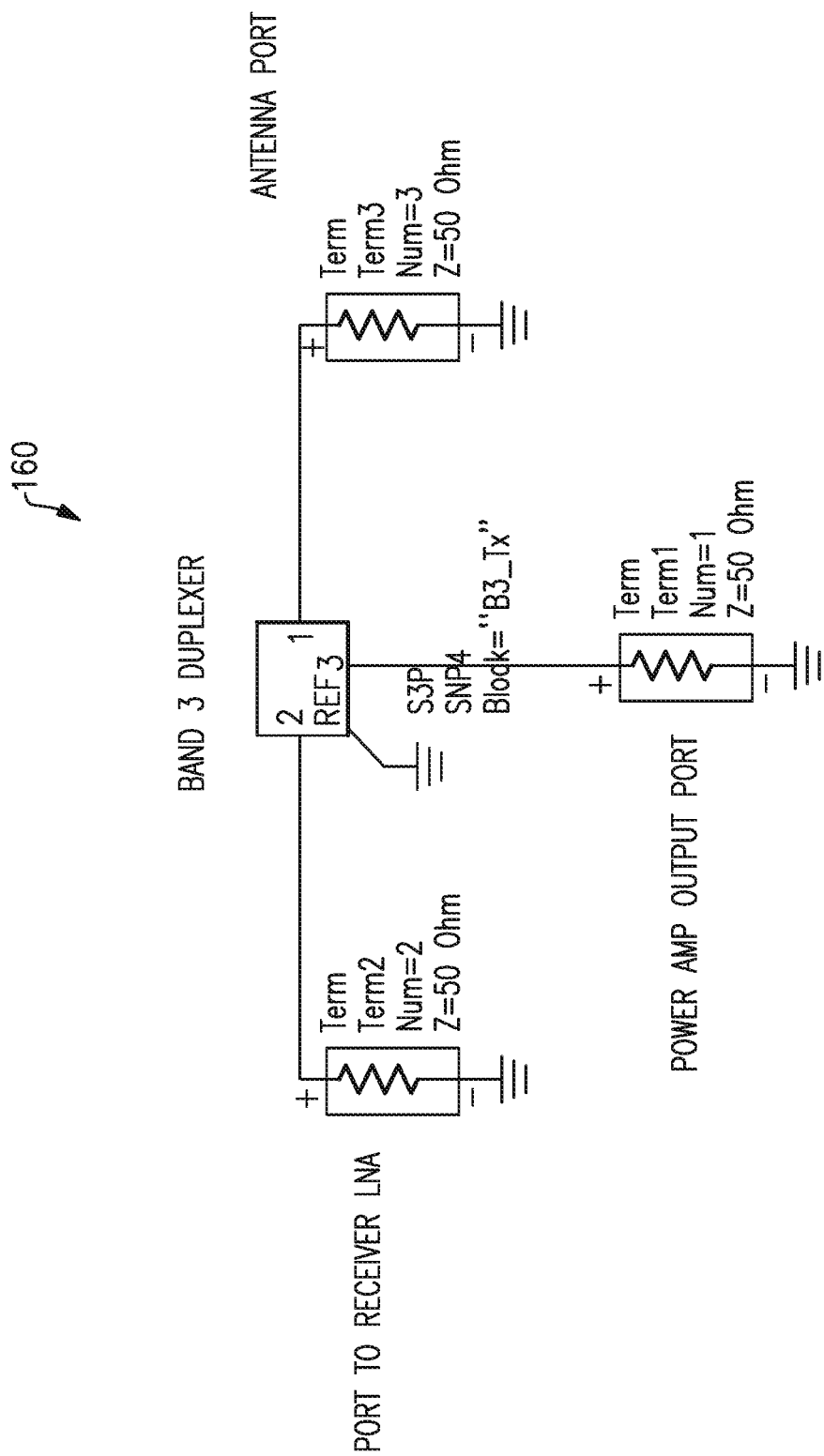
FIG. 13 shows an example simulation schematic of an example B3 duplexer.
Figure 15:
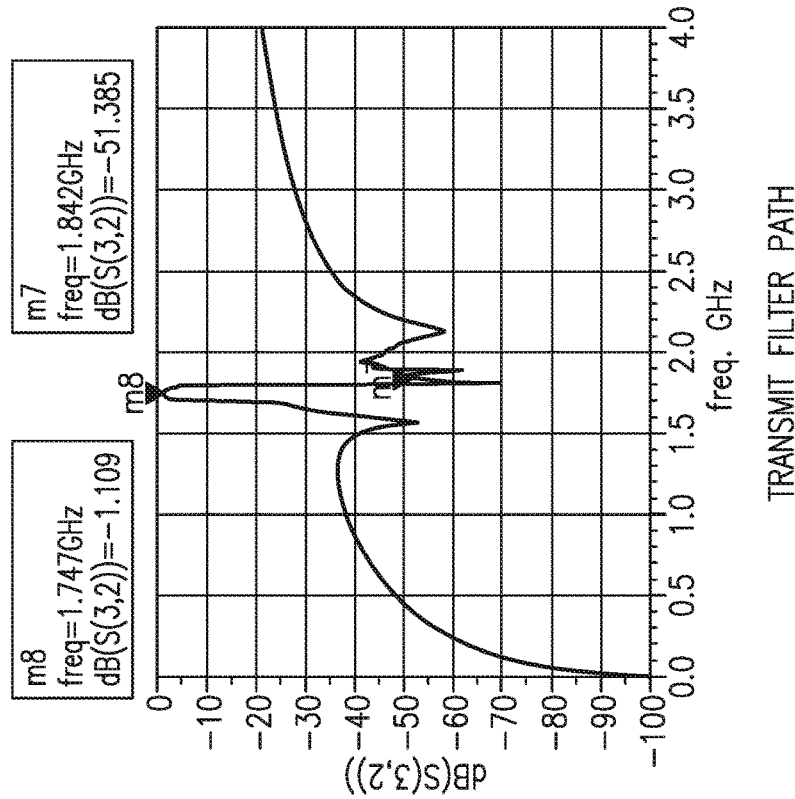
FIG. 15 shows an insertion loss plot for the Tx filter path associated with the B3 duplexer of FIG. 13.
Figure 14:
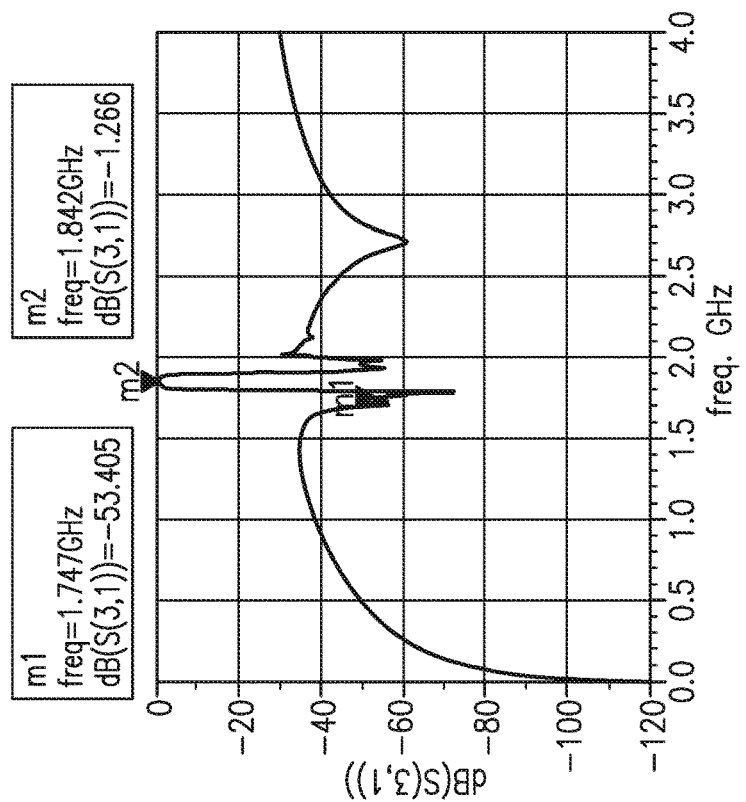
FIG. 14 shows an insertion loss plot for the Rx filter path associated with the B3 duplexer of FIG. 13.
Figure 16:
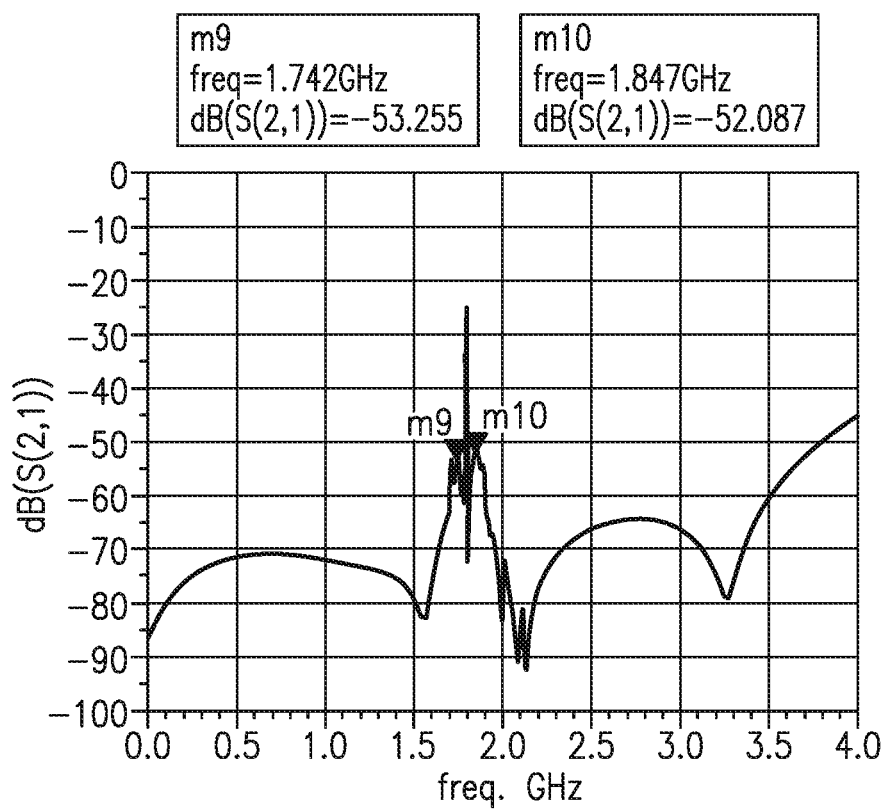
FIG. 16 shows a plot of isolation of the B3 duplexer of FIG. 13.

FIG. 13 shows an example simulation schematic 160 of a reference B3 duplexer. FIGS. 14 and 15 show plots of insertion losses associated with the reference B3 duplexer of FIG. 13. FIG. 14 is for the Rx filter path, and FIG. 15 is for the Tx filter path. FIG. 16 shows a plot of isolation of the reference B3 duplexer of FIG. 13.

Compared to the reference B3 duplexer of FIG. 13, it is noted that the insertion loss of the switch-combined Tx and Rx filters of FIG. 9 is about 0.6 to 0.7 dB higher in the switch-combined Tx and Rx filters. It is believed that such higher insertion loss is due to the antenna switch used for diplexing of the two filters. Also compared to the reference B3 duplexer, isolation is slightly better in both of the Tx and Rx bands in the switch-combined Tx and Rx filters.

In the examples described in reference to FIGS. 9 to 16, cellular band B3 is used as an example. It will be understood that similar comparisons can be made between a switch-combined Tx/Rx filters configuration and a reference duplexer configuration, for other cellular bands.

Figure 17:
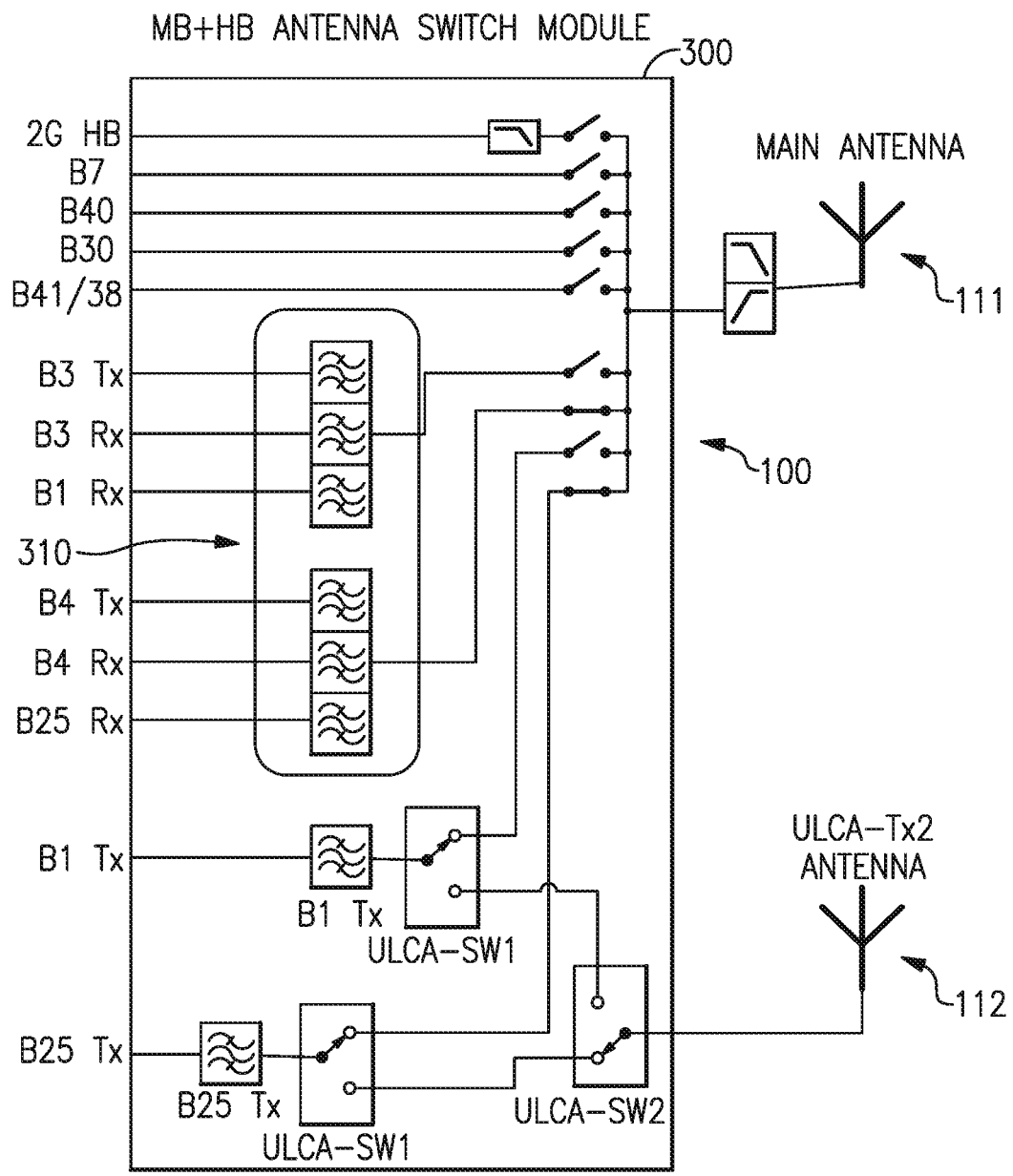
FIG. 17 shows that in some embodiments, a front-end architecture having one or more features as described herein can be implemented in a module such as an antenna switch module.

FIG. 17 shows that in some embodiments, a front-end architecture 100 having one or more features as described herein can be implemented in a module such as an antenna switch module 300. As described herein, such a module can be configured to provide, for example, DL CA functionality, UL CA functionality, and non-CA functionality (e.g., in UL and/or DL). Such functionalities can be facilitated by a primary antenna 111 and a second antenna 112.

In some embodiments, the module 300 of FIG. 17 can include a triplexer arrangement of a duplexer and a filter, three filters, a duplexer and a part of another duplexer, etc. For example, a Bx-band duplexer and a By-band filter can be combined to provide such a triplexer. In another example, a Bx Tx filter, a Bx Rx filter, and a By Rx filter can be combined to provide such a triplexer.

In the module 300 of FIG. 17, simultaneous FDD operations can be achieved with the Bx Tx and Bx Rx bands through the triplexer. Such a triplexer can also allow simultaneous receive operations with the Bx Rx and By Rx bands.

In the module 300 of FIG. 17, simultaneous transmit operations can be achieved with the Bx Tx and the By Tx bands. The Bx Tx band can be can be processed through the foregoing triplexer, and the By Tx band can be processed through a ByTx filter that is part of a second transmit path as described herein.

In the module 300 of FIG. 17, the second transmit path includes an additional switch that allows the second transmit path to be coupled to the primary antenna 111. Such an additional switch can allow improved IMD3 performance in the primary Tx/Rx path, as well as flexibility in various non-CA operations.

In the example of FIG. 17, as well as in other examples, B3 can be an example of the Bx band, and B1 can be an example of the By band. B4 can also be an example of the Bx band, and B25 can be an example of the By band. It will be understood that other combinations of cellular bands can form the Bx and By bands.

Figure 18:
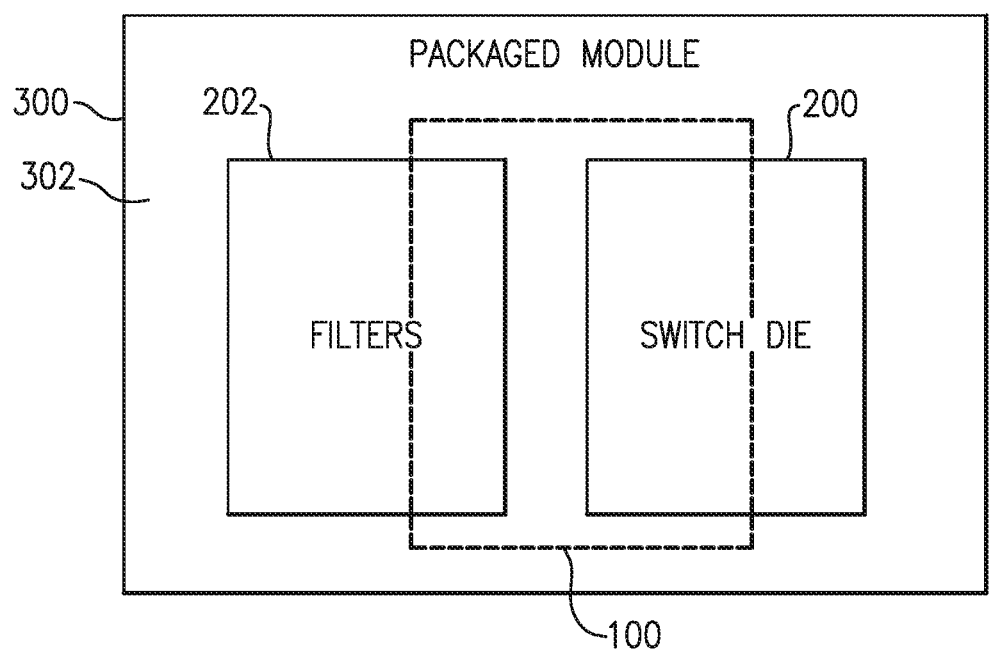
FIG. 18 shows that in some embodiments, a front-end architecture having one or more features as described herein can be implemented on a packaged module.

FIG. 18 shows that in some embodiments, a front-end architecture 100 having one or more features as described herein can be implemented on a packaged module 300. Such a module can include a packaging substrate 302 configured to receive a plurality of components.

In the example of FIG. 18, the packaged module 300 is shown to include a plurality of filters collectively indicated as 202. The packaged module 300 is shown to further include a switch die 200 having a switch circuit. Such a switch circuit (200) and the filters 202 can be configured to provide one or more embodiments of the front-end architecture 100 as described herein. In some embodiments, the packaged module 300 can be configured to include the example front-end architecture of FIG. 17.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless access point, a wireless base station, etc. Although described in the context of wireless devices, it will be understood that one or more features of the present disclosure can also be implemented in other RF systems such as base stations.

Figure 19:
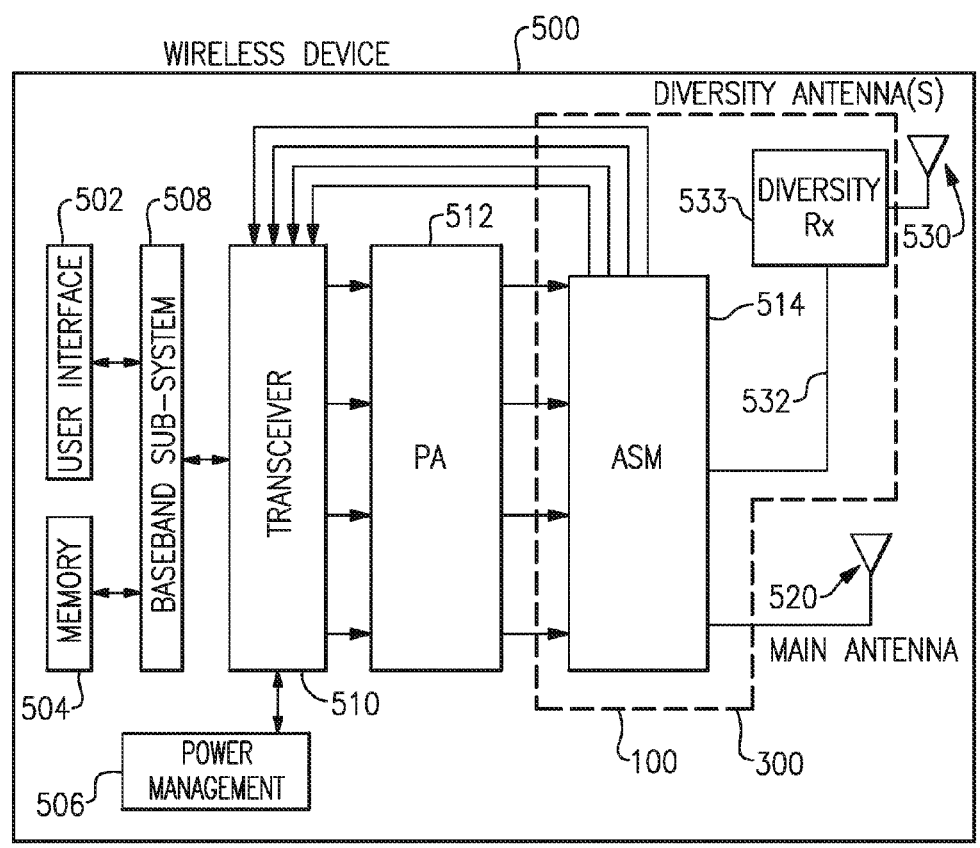
FIG. 19 depicts an example wireless device having one or more advantageous features described herein.

FIG. 19 depicts an example wireless device 500 having one or more advantageous features described herein. In some embodiments, a front-end architecture 100 having one or more features as described herein can be implemented as shown in such a wireless device. In some embodiments, some or all of various parts associated with the front-end architecture 100 can be implemented in a front-end module 300.

In the example of FIG. 19, power amplifiers (PAs) in a PA module 512 can receive their respective RF signals from a transceiver 510 that can be configured and operated to generate RF signals to be amplified and transmitted, and to process received signals. In some embodiments, such a transceiver can include a plurality of transceiver circuits such as the primary transceiver and the second transceiver described herein.

The transceiver 510 is shown to interact with a baseband sub-system 508 that is configured to provide conversion between data and/or voice signals suitable for a user and RF signals suitable for the transceiver 510. The transceiver 510 is also shown to be connected to a power management component 506 that is configured to manage power for the operation of the wireless device 500. Such power management can also control operations of the baseband sub-system 508 and other components of the wireless device 500.

The baseband sub-system 508 is shown to be connected to a user interface 502 to facilitate various input and output of voice and/or data provided to and received from the user. The baseband sub-system 508 can also be connected to a memory 504 that is configured to store data and/or instructions to facilitate the operation of the wireless device, and/or to provide storage of information for the user.

In the example of FIG. 19, a diversity receive (DRx) module 533 can be implemented between one or more diversity antennas (e.g., diversity antenna 530) and an antenna switch module (ASM) 514. Such a configuration can allow an RF signal received through the diversity antenna 530 to be processed (in some embodiments, including amplification by an LNA) with little or no loss of and/or little or no addition of noise to the RF signal from the diversity antenna 530. Such processed signal from the DRx module 533 can then be routed to the ASM through one or more signal paths.

In the example of FIG. 19, a main antenna 520 can be configured to, for example, facilitate transmission of RF signals from the PA module 512. In some embodiments, receive operations can also be achieved through the main antenna. In some embodiments, the main antenna 520 can be the primary antenna (e.g., 111 in FIGS. 6-8), and the diversity antenna 530 can be the second antenna (e.g., 112 in FIGS. 6-8) as described herein.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

It is noted that while some examples are described herein in the context of carrier aggregation of two bands, one or more features of the present disclosure can also be implemented in configurations involving carrier aggregation of different numbers of bands.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless architecture comprising:
a first system including a first signal routing circuit for a first transceiver, a first antenna node, a duplexer configured to support frequency-division duplexing transmit and receive operations for a first band through the first antenna node and also support a receive operation for a second band through the first antenna node, an antenna switch circuit coupled to the duplexer through a common path and also coupled to the first antenna node, and a receive path having a receive filter associated with the second band and coupled to the antenna switch through the common path;
a second system including a second signal routing circuit for a second transceiver and a second antenna node, the second system configured to support a transmit operation for the second band through a transmit path that includes a transmit filter and first and second switches between the second transceiver and the second antenna node, such that a pole of the first switch is coupled to the transmit filter and a pole of the second switch is coupled to the second antenna node, and a throw of the first switch is coupled to a throw of the second switch; and a switchable path implemented to selectively allow the transmit operation for the second band to be performed through the second antenna node or the first antenna node.

2. The wireless architecture of claim 1 wherein the duplexer is coupled to the first transceiver through transmit and receive paths.

3. The wireless architecture of claim 1 wherein the antenna switch circuit is configured such that the frequency-division duplexing transmit and receive operations for the first band and the receive operation for the second band are achieved through a single switch.

4. The wireless architecture of claim 1 wherein the first switch includes another throw that is coupled to the switchable path to provide a transmit route between the transmit filter of the second system and the first antenna node.

5. The wireless architecture of claim 4 wherein the first switch is configured to provide a desired amount of isolation between the first system and the second system, such that an intermodulation distortion resulting from one system to the other system is below a selected level.

6. The wireless architecture of claim 4 wherein the receive filter of the first system and the transmit filter of the second system are configured to provide duplexing functionality by the first switch of the second system and the antenna switch circuit of the first system.

7. The wireless architecture of claim 6 wherein the transmit filter of the second system is coupled to the first antenna node of the first system through another single switch of the antenna switch circuit.

8. The wireless architecture of claim 1 wherein the first system and the second system are configured to be capable of supporting an uplink carrier aggregation operation with the first transmit band and the second transmit band.

9. The wireless architecture of claim 1 further comprising a transmit select switch implemented to allow routing of a transmit signal from the first transceiver to the second signal routing circuit, and/or routing of a transmit signal from the second transceiver to the first signal routing circuit.

10. The wireless architecture of claim 9 wherein the transmit select switch includes a double-pole-double-throw functionality, with a first pole coupled to the first transceiver, a second pole coupled to the second transceiver, a first throw coupled to a power amplifier of the first system, and a second throw coupled to a power amplifier of the second system.

11. The wireless architecture of claim 1 wherein the first band includes a cellular band B3, and the second band includes a cellular band B1.

12. A front-end module comprising:
a packaging substrate configured to receive a plurality of components; and
a front-end architecture implemented on the packaging substrate and including a first system having a first signal routing circuit for a first transceiver, a first antenna node, a duplexer configured to support frequency-division duplexing transmit and receive operations for a first band through the first antenna node and also support a receive operation for a second band through the first antenna node, an antenna switch circuit coupled to the duplexer through a common path and also coupled to the first antenna node, and a receive path having a receive filter associated with the second band and coupled to the antenna switch through the common path, the front-end architecture further including a second system having a second signal routing circuit for a second transceiver and a second antenna node, the second system configured to support a transmit operation for the second band through a transmit path that includes a transmit filter and first and second switches between the second transceiver and the second antenna node, such that a pole of the first switch is coupled to the transmit filter and a pole of the second switch is coupled to the second antenna node, and a throw of the first switch is coupled to a throw of the second switch, the front-end architecture further including a switchable path implemented to selectively allow the transmit operation for the second band to be performed through the second antenna node or the first antenna node.

13. A wireless device comprising:
a first transceiver and a second transceiver;
a first antenna and a second antenna; and
a front-end architecture implemented between the first and second transceivers and the first and second antennas, the front-end architecture including a first system having a first signal routing circuit for the first transceiver, a duplexer configured to support frequency-division duplexing transmit and receive operations for a first band through the first antenna and also support a receive operation for a second band through the first antenna, an antenna switch circuit coupled to the duplexer through a common path and also coupled to the first antenna, and a receive path having a receive filter associated with the second band and coupled to the antenna switch through the common path, the front-end architecture further including a second system having a second signal routing circuit for a second transceiver, the second system configured to support a transmit operation for the second band through a transmit path that includes a transmit filter and first and second switches between the second transceiver and the second antenna, such that a pole of the first switch is coupled to the transmit filter and a pole of the second switch is coupled to the second antenna, and a throw of the first switch is coupled to a throw of the second switch, the front-end architecture further including a switchable path implemented to selectively allow the transmit operation for the second band to be performed through the second antenna or the first antenna.

14. The wireless device of claim 13 wherein the wireless device is a cellular phone.

15. The wireless device of claim 14 wherein the first band includes a cellular band B3, and the second band includes a cellular band B1.

* * * * *